US011163842B2

(12) United States Patent
Weldemariam et al.

(10) Patent No.: US 11,163,842 B2
(45) Date of Patent: Nov. 2, 2021

(54) PERSONALIZED TABLE OF CONTENTS (TOC) GENERATION BASED ON SEARCH RESULTS

(71) Applicant: International Business Machines Corporation, Armonk, NY (US)

(72) Inventors: Komminist Weldemariam, Ottawa (CA); Michael S Gordon, Yorktown Heights, NY (US); Shikhar Kwatra, Durham, NC (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 16/194,264

(22) Filed: Nov. 16, 2018

(65) Prior Publication Data

US 2020/0159795 A1 May 21, 2020

(51) Int. Cl.

| | |
|---|---|
| ***G06F 16/9535*** | (2019.01) |
| ***G06F 16/9538*** | (2019.01) |
| ***G06F 16/2457*** | (2019.01) |
| ***G06Q 50/20*** | (2012.01) |
| ***G06F 3/0481*** | (2013.01) |
| ***G06F 3/0484*** | (2013.01) |

(52) U.S. Cl.

CPC ........ *G06F 16/9535* (2019.01); *G06F 3/0481* (2013.01); *G06F 3/0484* (2013.01); *G06F 16/24578* (2019.01); *G06F 16/9538* (2019.01); *G06Q 50/2053* (2013.01)

(58) Field of Classification Search

CPC ........... G06F 16/9353; G06F 16/24578; G06F 16/9538

See application file for complete search history.

(56) References Cited

U.S. PATENT DOCUMENTS

| | | | | |
|---|---|---|---|---|
| 4,972,349 | A * | 11/1990 | Kleinberger | G06F 16/30 |
| 6,199,067 | B1 * | 3/2001 | Geller | G06F 16/337 |
| 2003/0056222 | A1 | 3/2003 | Yoshiaki et al. | |
| 2011/0167139 | A1 | 7/2011 | Taniguchi et al. | |
| 2012/0265770 | A1 * | 10/2012 | Desjardins | G06Q 30/02 707/748 |

(Continued)

OTHER PUBLICATIONS

Solanki, Operating Systems (DOS/WINDOWS) date unknown [captured on Dec. 4, 2017 by archive.org, Open Source Drug Discovery. net, https://web.archive.org/web/20171204172259/http://crdd.osdd.net/raghava/slides/prephd/doslec.htm.*

(Continued)

*Primary Examiner* — Jason G Liao

(74) *Attorney, Agent, or Firm* — Shimon Benjamin; Lou Percello, Attorney, PLLC

(57) ABSTRACT

The present invention is a system and method that generates a Table of Contents (TOC) customized to the user knowledge about the concept(s) in the user query and the specific context and preferences of the user. The invention identifies search concepts within the search queries, receives search results, and splits the search results into one or more result segments. In a preferred embodiment, a correlation strength between concepts in one or more of the result segments and the user search query, along with reference to the user knowledge, context, and/or preferences determine which result segments are selected in sequenced to form the TOC.

13 Claims, 5 Drawing Sheets

200

User Query — 205
Query Handler — 210
To Network or Internal Search Function — 215
Receive Search Results — 220
Split into Result Segments — 225
Category/Correlation — 230
Selection/Sequencing/TOC/Learn — 235
Output/Display — 240
Concept Generator — 245
Knowledge Profile — 250
User Context — 255
User Preference Profile — 265
270, 275, 280, 285, 245

(56) References Cited

U.S. PATENT DOCUMENTS

| | | | |
|---|---|---|---|
| 2015/0143394 | A1 | 5/2015 | Hijikata et al. |
| 2017/0140007 | A1 | 5/2017 | Agarwal et al. |

OTHER PUBLICATIONS

Computer Hope, Printing DOS output to printer: date unknown[ captured on Oct. 10, 2000 by archive.org], computerhope.com, https://web.archive.org/web/20001010173338/https://www.computerhope.com/issues/ch000199.htm.*

Kruger et al., "Unskilled and Unaware of It: How Difficulties in Recognizing One's Own Incompetence Lead to Inflated Self-Assessments" 1999, Journal of Personality and Social Psychology, vol. 77 No. 6, 1121-34.*

Roy et al., A personalized information retrieval module for retrieving learning materials Aug. 1, 9, 2009 International Workshop on Technology for Education, pp. 68-74.*

* cited by examiner 50
54N/54, Mobile/Remote Devices
15/10, Network Node, Storage Device
50, Network Environment
54D/54, Desktop
200, 400
75
20
10, Network Node
12, Network Interfaces and Interconnections
20, Network Connection
54C/54, Laptop
54A/54, PDA
54B/54, Cell Phone 200
User Query
205
Query Handler
210
To Network or Internal Search Function
215
Receive Search Results
220
Split into Result Segments
225
Category/Correlation
230
Selection/Sequencing/TOC/Learn
235
Output/Display
240
245
270
275
280
285
Concept Generator
245
Knowledge Profile
250
User Context
255
User Preference Profile
265

User Query = Industrial Robot
305
320
300
Robots
310
Web Bots
330
Medical Robots
340
Industrial Robots
350
Design Industrial Robots
360
Financing Industrial Robots
370
Design Medical Robots
380

400
430
Query Analysis 410
Context 420
450
User Knowledge 440
Historical Output 460
DSNN 455
490
Predicted Search Req't 470
Feedback 480

500
Input/Output
520
User Context I/O
530
User Preference Profile I/O
540
Enter Query
550
View/Modify
560
Raw Search Results
570
TOC
510

PERSONALIZED TABLE OF CONTENTS (TOC) GENERATION BASED ON SEARCH RESULTS

BACKGROUND

The present invention relates to a knowledge-based system that helps develop search queries; develop search strategies; and interpret, organize, and present search results. Particularly, the invention is a system and method for dynamically generating an organization scheme, e.g. a Table of Contents (TOC), to identify information needed by a user, generate queries to access desired and/or required information, help develop a search strategy, and organize search results for a user.

Users can have difficulty creating efficient search queries and search strategies because the user doesn't understand prerequisite, subtopic, and/or super-topics of information required for the user to understand the searched topic. Even if the user acquires search results that address the user's need, the user may not understand the search results, may not understand how to interpret the search results which often return multiple entries and documents of different types (e.g., text document such as PDF, video, audio, websites, etc.), and/or may not know how to organize the search results in a clear way.

This problem can be user specific because the knowledge or level of comprehension a user has about a topic being searched and the profile and context of the user varies from user to user, from time to time, and even from search to search of the same topic.

SUMMARY

The present invention is a system and method comprising one or more network interfaces, one or more central processing units (CPUs), one or more memories, and one or more inputs and outputs—including at least one graphical user interface (GUI). A search engine uses one or more search queries to receive one or more search results over the network interface. The system identifies search concepts within the search queries and/or search results. The received search results are split into one or more result segments. In a preferred embodiment, the system determines a correlation strength between one or more of the result segments and at least one of one or more search concepts. Relevance of the search segments and/or concepts is determined with reference to the user knowledge, context, and/or preferences to determine which result segments are selected, sequenced, and organized to form a Table of Contents (TOC.) The TOC is customized to the user knowledge about the concept(s) in the user query and the specific context and preferences of the user. The system learns and can provide the user with suggestions for additional searches or can automatically perform these searches.

DETAILED DESCRIPTION

Figure 1:
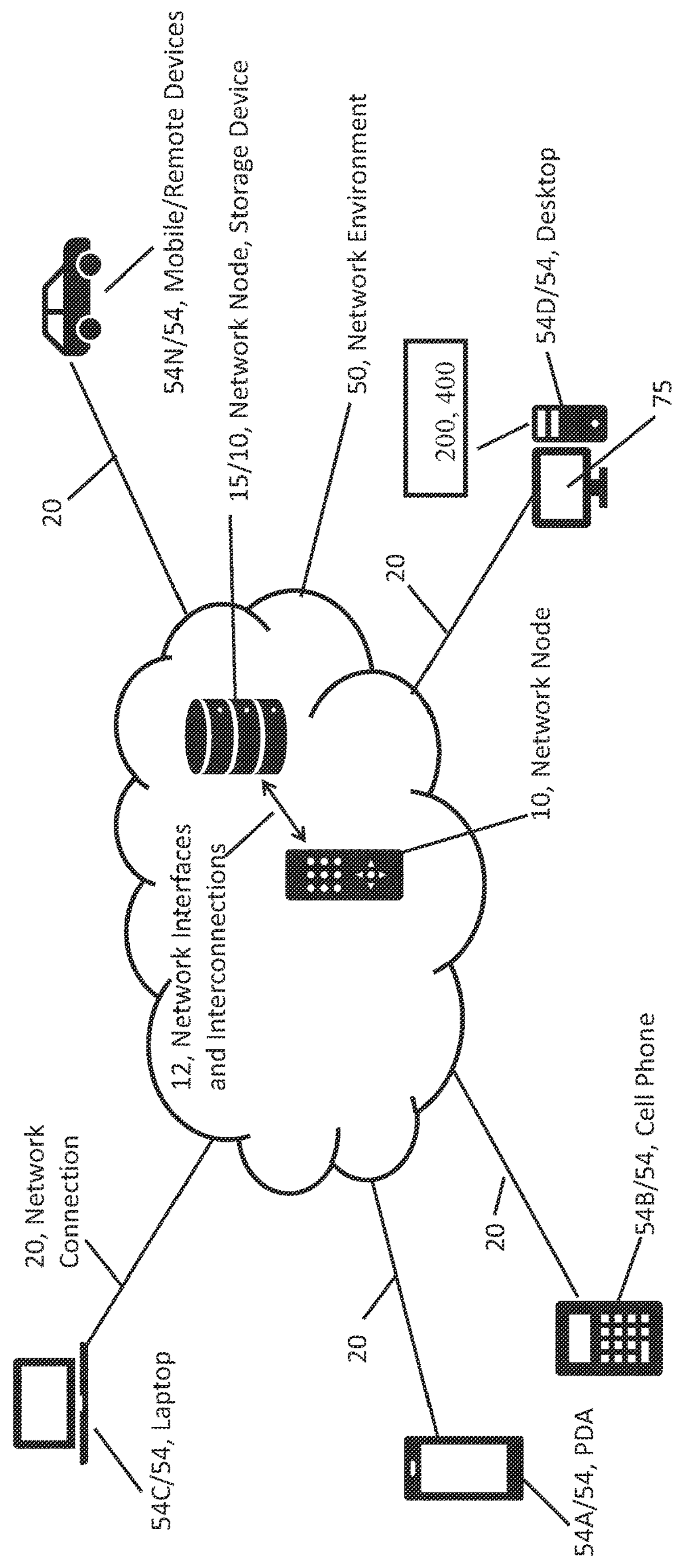
FIG. 1 is an illustration of the present invention running on a stand-alone device or in the context of a network environment.

Generally, a user's Internet search requirement is very broad and ad-hoc in nature. Typical users search topics on the Internet by providing a search query to a search engine either using a text or voice-based interface. Based on the search query, one or multiple search results are displayed on the same topic. However, the query may not address information necessary for the user to use the search results easily or may not yield search results that are understandable to the user, relevant, or even complete. Moreover, the search results often are not organized in a way that suits the user's current level of comprehension and/or user context, e.g. in a chronologically, topically, and/or concept wise organization.

For example, while searching for a topic, a user may not know what other topics or subtopics the user needs, to obtain accurate and complete search results in an organized presentation, customized to the users' current comprehension of the topic and/or other context surrounding the user.

The present invention provides the user search results that are more complete and represent accurate and understandable information about the topic searched, customized to the user's current comprehension of the topic and/or the user context. In some embodiments, search results are based on a predicted search query that considers the current user's comprehension about the searched topic and/or the current user context. The invention improves the user query and organizes the search results to meet the needs of the user at the time and for the purpose of the search.

Accordingly, aspects of the invention provide a method, a system, and a graphical user interface (GUI) that automatically create a TOC for a user in response to the user search query. The invention identifies and organizes topics according to what the user needs at a given time, and in preferred embodiments determines the required prerequisite and subtopic information based on the user's knowledge/comprehension level at the time of the search.

Further aspects of the invention develop predictive searches and provide for training a machine learning model to dynamically organize and present topics (and subtopics) of the search results in the TOC. For example, the TOC presents search results on a graphical user interface (GUI) by identifying not only descriptions of the search topic(s) but also subtopics and information prerequisite to understand the topic (and sub topic) as well as atomic level cross-referred topic, sub-topic according to atomic level concept inferred from the search terms. Advantageously, one or more embodiments organize the TOC according to the search results in a suggested sequence so that the user can learn prerequisite information before reviewing the topic(s) searched. In other embodiments, information is presented or marked in such a way to help the user understand the information better in a given context. For example, if the user's context is busy, less relevant information is summarized or marked as less important to the user in their current busy state, so this less relevant information can be reviewed quickly or temporarily ignored.

In alternative embodiments, the user may know the topic but want to show the various contents to another person, e.g. a third party. In this case, the user's comprehension may not be considered but the comprehension of the third party is used to develop the TOC. The historical information related to the TOC can be used to remind the user has the TOC evolved and/or provide this information to others.

Referring now to FIG. 1, an illustration of the present invention 200 used in a network environment 50. As illustrated, the network environment 50 includes one or more network nodes 10 that include storage devices 15; central processing units (CPU,) not shown; input/output devices, not shown; and any other computer hardware associated with network devices. The network nodes 10, input/output devices 10, storage devices 10 are interconnected through network interfaces and interconnections 12. The network 50 may comprise physical hardware or virtual components grouped into one or more networks, such as public, private, community, hybrid, and corporate networks and/or cloud structures that may also be interconnected with other similar networks 50 through interconnections 12.

The network environment 50 can provide infrastructure, platforms, and/or software as services to customers and/or client devices (generally 54, including but not limited to 54A, 54B, 54C, 54D, and 54N) connected (typically 20) to the network 50. For example, client devices 54 connected to the network can include personal digital assistants (PDA) 54A, cell phones 54B, laptop or notepad computer 54C, desktop computer or server 54D. Additional mobile devices or remote devices, e.g. on vehicles (including automobiles, trucks, trains, boats, etc., and remote sensing devices (e.g., remote weather sensors, etc.) also can be connected in the network 50. As stated, the description of the network 50 and the computing nodes (10, 12 typically) is intended to be illustrative only.

User interfaces, e.g. a graphical user interface (typically 75) are shown used with the desktop computer/server 54D typically, but one or more of these user interfaces (key board, mouse, pointing device, voice recognition, etc.) can be used with any of the devices connected in 12 or connected to 20 the network 50. Network connections (typically 10, 20) can be any known connections for transmitting and receiving information including network interconnects, hardwiring, cable, radio frequency, satellite, etc. The connections (10, 20) envision hardware connections and switching components, software and virtual connection and connections, web browsers, and other interfaces.

Figure 2:
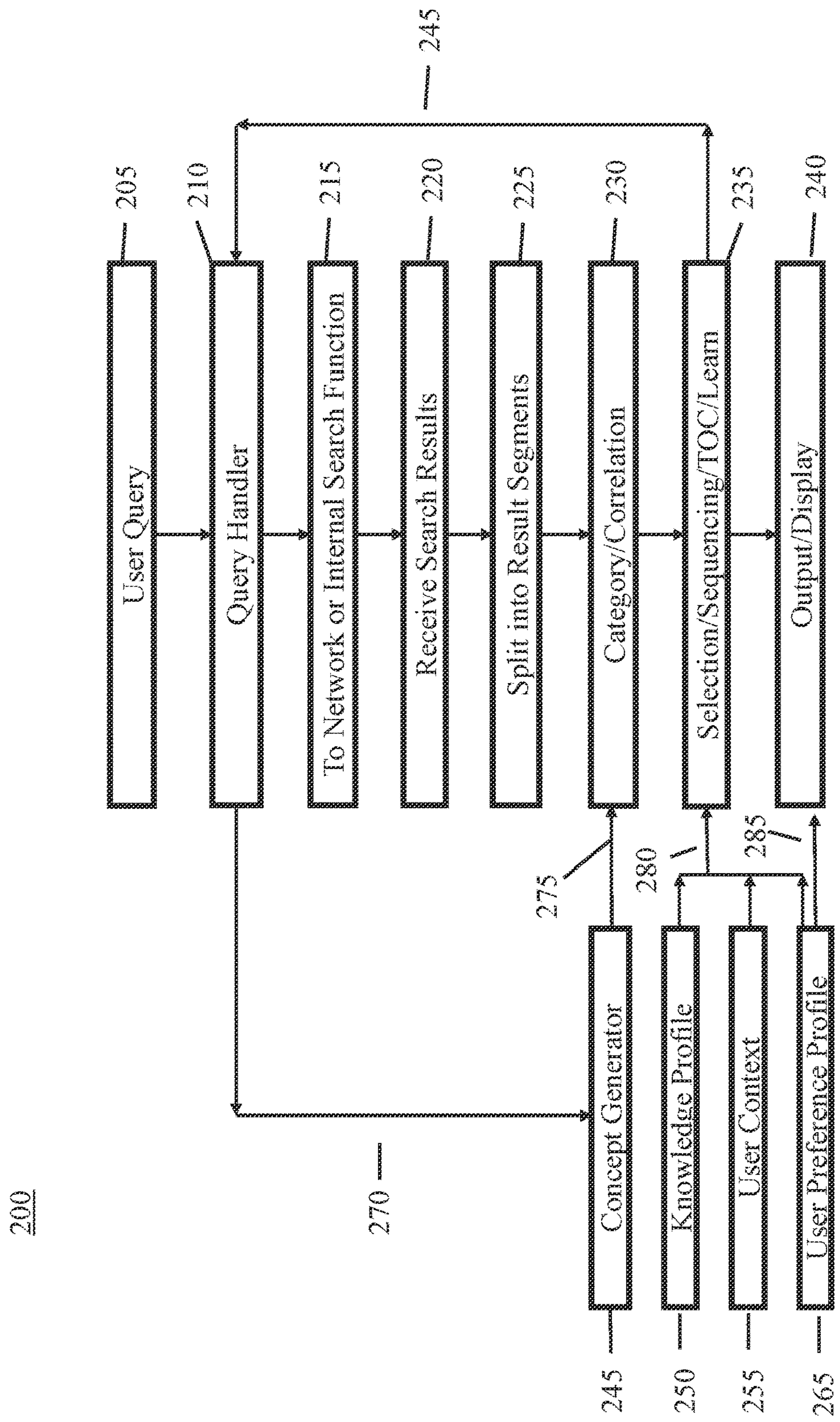
FIG. 2 is a flow chart of one preferred embodiment of the present invention.
Figure 4:
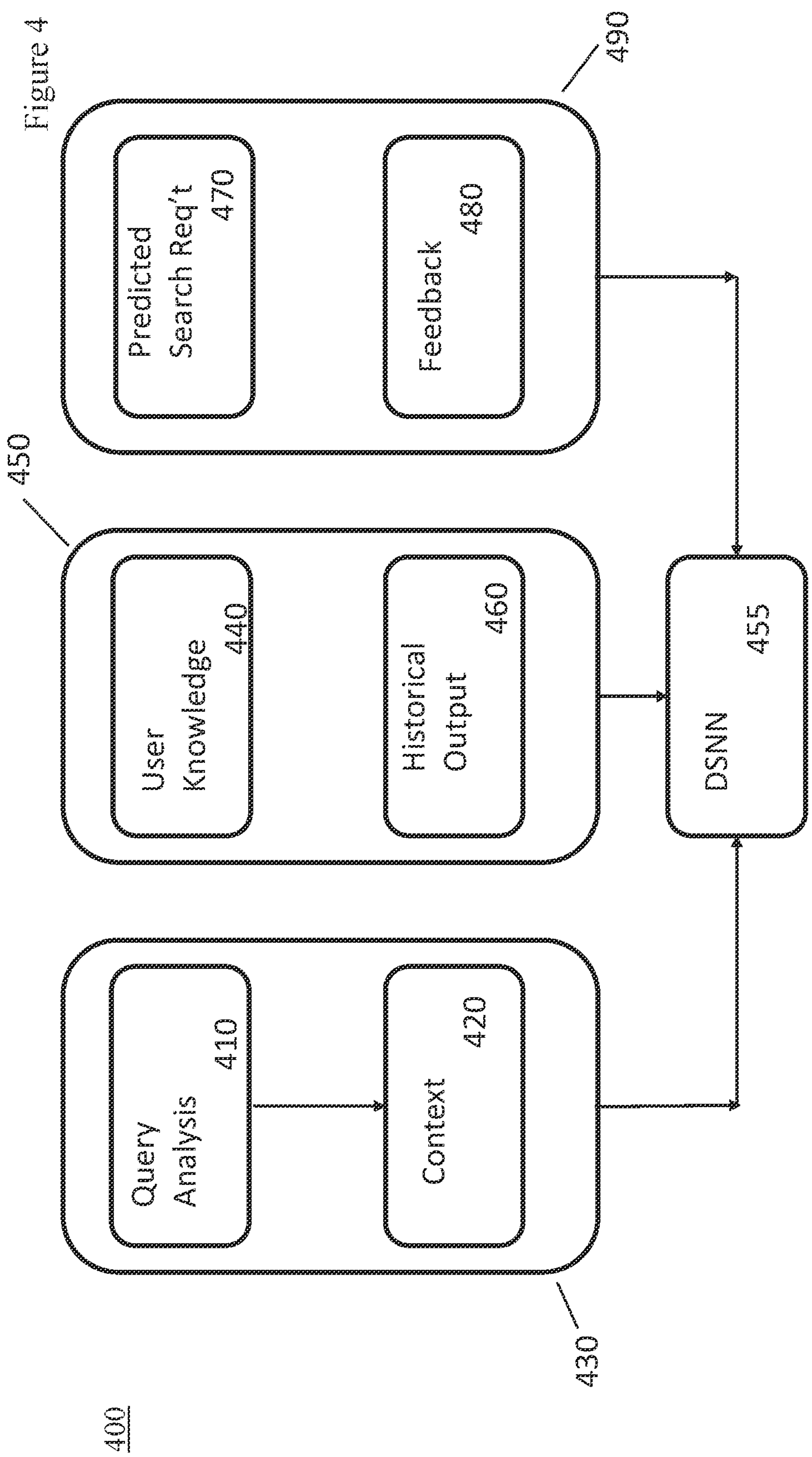
FIG. 4 is a diagram showing one embodiment of this invention using a deep stacked neural network.

Preferred embodiments of the present invention (200, 400) shown in more detail in FIGS. 2 and 4, typically run on the desktop computer/server 54D but can run on, control, be controlled, and/or be displayed on any of the network node/devices 10 and/or client devices 54. In addition, the invention 200 can run on a single device (10, 54), or multiple devices (10, 54), or be distributed across multiple devices (10, 54.) The invention can be provided as a service on the network 50 to clients 54 connected to the network or can run on an individual device 54 as a subscription or local process.

FIG. 2 is a flow chart of one preferred embodiment of the present invention 200.

The process 200 begins by receiving a user query 205 for information. For example, the query 205 can comprise a sequence of words, phrases, or other search terms (even images and/or audio) used to find information over a network 50 like the Internet. For example, the Query Handler 210 can use natural language processing (NLP) techniques to determine the search terms. The query 205 can have or imply concepts that may or may not be apparent to the user. For example, use of a query 205 "Industrial Robotic Design" might include the concepts of where to purchase a robot, how robots are used, how robots are designed, economic impact of robots, etc. These concepts might not be readily apparent to the user but can be obtained by analysis of the User Query 205 using NLP techniques. The search terms and/or concepts can be organized into a knowledge graph, G, or ontology. See discussion of FIG. 3 below.

A user might have an interest in some of the results of the search but not others, or be unaware of a need to have a higher level of comprehension of some of these concepts. For instance, the user interested in investing in industrial robotic manufacturing companies may have a strong background in robot design but may lack knowledge about finance which is needed to make an accurate investment analysis.

The query 205 is sent to a query handler 210 which may parse the query 205 into subqueries and then direct a search engine to "crawl" the network 50 to determine which sites on the network have available information matching the search terms in the query (or each of the subqueries) 210. Some query handlers 210 might expand the search terms of the query to determine a better definition of "concepts" in the query, e.g. by using a concept generator 245. The function of the concept generator 245 can be performed in the query handler and/or provided 270 to be performed in the search engine 215, category/correlation step 230, other steps, and/or distributed over different locations on the network 50.

For example, the concept generator 245 might look up the search terms in an ontology, like a dictionary, to determine a broader class and/or subclasses related to the search terms in the query 205. In some embodiments, before the search is done, an ontology including "Industrial Robotic Design" might have as a broader concept the term "robot" and as a subtopic "automotive robot" or "medical robot." The concepts 245 are sent 275 to category/correlation step 230. The concept descriptions 245 can be additional search terms that are also used in the search of the network, e.g. terms identified in a knowledge graph generated by the Query Handler 210 to be used by the search engine 215.

Once the Query Handler 210 analyzes the query 205, e.g. parses for search terms and possibly expands/adds terms to more generic concept and sub concepts 245, the terms are sent to crawl the network 215 by the search engine. As an example, the search terms "hit" a site and are compared against terms on a list at the site that describe information available on the site. If information related to the search terms is available, access information, e.g. a URL, and/or other information is returned 215. Note that similar processes are implemented on internal networks or even on a private computer system accessing a private, secure database.

The search engine receives the Search Results 220 e.g. through the user's browser/computer, typically 54. While the user has received information 220 related to the search terms, the information may have no particular organization and may not account for: specific knowledge or level of comprehension the user has about the topic, needs the users has for the information, related or background information the user may need to understand the information, how to present the information for a given user context (e.g., the user is tired, in a hurry, meeting a deadline, etc.), etc.

The method 200 splits 225 the search results into N sequential segments 225. Segment boundaries may be a paragraph, sub-section etc. The split might also occur between concepts, e.g. nodes, in the knowledge graph, G.

Knowledge graphs can be retrieved and/or developed for each concept described by one or more of the search terms. Again, the knowledge graph/ontology can be developed by the Query Handler 210 and/or the Splitter 225. For example, for the "Industrial Robot Design" a knowledge graph can be generated by using a table of contents of a product manual or sales literature of a robot manufacturer or by referring to an index of a book about industrial robots.

The method 200 then determines how strongly the concepts of each segment 225 of the search results correlates 230 to one or more of the concepts in the search terms of the User Query 205. The search result segments 225 may also be categorized in this step 230.

In one embodiment, for each of one or more concepts C of the User Query 205, the system generates a function to score how strongly a Segment 225 aligns/correlates 230 with C (i.e. relevance to C.) This can be achieved based on text similarity, comparison of word counts, and query expansion measures. If any Segment 225 does not correlate well with any concept of the User Query 205, the process 200 can merge it with either preceding or following Segments 225, based on relative similarity. Alternatively, the process 200 can de-select or de-emphasis the non-correlated Segment 225.

In one non-limiting embodiment, a broad concept C in the User Query 205 can be expanding into a knowledge graph/ontology of sub-concepts. The one or more of the sub concepts can be correlate to one or more Segments 225. For example, as a non-limiting example, the system the Segments 225 and categorizes a query concept into three different sub concepts in a knowledge graph/ontology:

a. Core(C): Set of Segments that explain C (Segments linked with only C)

b. Req(C): Set of Segments that introduce C (Segments linked with C and their prerequisite)

c. Use(C): Set of Segments that use C to explain other related concepts (Segments linked with C and the concepts using C)

Other categories are envisioned.

In alternative embodiments, the categories may be subcategorized by the user (or third party) knowledge profile 250, user context 255, and/or user preference profile 265. For example, a set of Segments, Use (C), might be categorized in a class particularly useful to the user.

The method 200 has a Knowledge Profile 250 of the user (or third party) that includes the user's mastery level of various topics, e.g. medical robots. The Knowledge Profile 250 can be developed from information manually provided by the user; user activity like previous searches, education, job skills, job title, etc.; papers published by the user; opinions of others, e.g. on social media; etc. If the user has a strong background in a concept or topic like medical robotics, a subcategory relating to medical robotics can be created in the ontology, e.g. by passing that information 245 to the Query Handler 210.

In the Selection/Sequencing/TOC/Learn (SSTL) step 235, Result Segments 225 that are highly correlated to a category or subcategory, e.g. industrial robotics, can be presented but deemphasized in the TOC because the user will likely be familiar with that information. On the other hand, if the Result Segment 225 has no or low correlation to the Knowledge Profile 250, e.g. the user has little knowledge about financing industrial robots, result segments in a financial subcategory might be broken down in more detail in the TOC. In addition, the TOC might include pre-requisite information about finance organized for the user as background to understand the search results better.

The SSTL step 235 determines which result segments are selected, deselected, emphasized, deemphasized, or expanded in the TOC. The SSTL 235 performs this function based on knowledge and preference profiles and context information received 280 from the Knowledge Profile 250 (described above), the User Context 255, and/or the User Preference Profile 265. The SSTL also uses information received 280 to determine how information in the TOC is selected and sequenced. If the Results Segments 225 available do not provide information needed in the TOC, e.g. prerequisite information about financing robotic companies, the SSTL 235 can provide 245 search terms to the Query Handler 210 to run one or more new searches to provide this information in a new result segment(s) 225.

The User Preference Profile 265 also can contain information about formats and/or output devices the user prefers to use when receiving information. This information 265 is also provided 285 to the Output/Display step 240 which determines how and on what device the TOC is presented to the user.

As non-limiting examples, the user might prefer a certain template 265 to display the TOC on the GUI. Prerequisite information might be presented on one area of the screen in a particular color while user information might be display as a pop-up link in another area of the GUI. The User Context 255 might indicate that the user needs the TOC while driving to a meeting so only audio information would be presented in the TOC during this time period. The user might indicate that the TOC is to be sent to a third party (whose Knowledge Profile 250 and User Context 255 is used instead) and the User Preference Profile 265 would direct 285 the TOC Output 240 be sent to the third party by an e-mail over the network 50.

Information in the Knowledge Profile 250, User Context 255, and User Preference Profile 265 is dynamic. Therefore, by periodically running the SSTL 235 and/or entire process 200 the TOC is updated to address the current state of user's knowledge, context, and preference.

The Knowledge Profile 250 includes information that relates to the comprehensive level of the user (or third party) relative to the query and/or concepts in the User Query 205. Information can be provided to the Knowledge Profile 250 in a variety of ways.

The user can provide this information 250 manually, e.g. through a template or questionnaire.

The system can monitor and analyse the user's historical search patterns. The previously searched or read content are analysed to determine concepts in the content that are relevant to the query and/or concepts in the User Query 205. This can be done by word counts or other known document analysis techniques. The concepts that are in the prior content can be matched to an ontology defining level of understanding of the query, concepts, and/or topics 205 (for example syllabuses or tables of contents for learning or understanding the topic) to determine the user skill level about the query, concepts, and/or topics 205. A similar analysis can be done on the user's purchasing habits (buying books on a relevant topic), membership in organizations in the technical domain, social media groups, crowd sourcing, etc. For example, one resource Internet URL or book/magazine title accessed by the user would might indicate an advanced level of understanding of a topic or concept in a given query.

In one embodiment, the SSTL 235 gives a weight to each Result Segment 225 based on the user level of comprehension of that Segment topic/concept in the Knowledge Profile 250. If the user has a high level of understanding of industrial robots, a Result Segment 225 about industrial robots would get a higher weight than a Result Segment 225 about finance, a concept with a lower user level of comprehension in the Knowledge Profile 250.

As stated before, as the user's level of understanding changes over time, the system output 240 and TOC will change. For example, a Calculus student beginning the course would perform searches on Calculus concepts with a lower skill level indicated in the Knowledge Profile 250. As the student's searches for more difficult material in Calculus and/or their test scores improve, the Knowledge Profile 250 changes and the system 200 would provide a changed TOC. In addition, a prerequisite topic, like topics in algebra that are needed to understand Calculus might be absent in the Knowledge Profile 250 in the novice student but are identified as prerequisites in a knowledge graph about understanding Calculus. This lack of knowledge of prerequisite Algebra is identified 245 to the Query Handler 210 to initiate a search request for the pre-requisite information, e.g. Algebra topics, and the system 200 would provide pre-requisite identification in the TOC. As the student becomes more knowledgeable, the prerequisite topics in Algebra would be identified as required but since the Knowledge Profile 250 indicates now that the student attained a level of comprehension in Algebra, there is no need to search for this information or even identify or emphasize it on the TOC.

The User Context 255 generally includes information about the user that is related to the user's situation rather than the user's level of understanding. Non-limiting examples of information in The User Context 255 include the user's emotional state, physical access to certain information, schedules, time of day, use of the TOC information, physical condition, stress level, etc.

User Context 255 information can be obtained in various ways. The user can manually enter User Context 255, e.g. by filling out a form or template. Also, there are applications that determine emotional state from user images or biometrics, e.g. using Internet of Things (IoT) sensors, like smart watches. Monitoring user language use or voice tone also can be an indication of a user state or mood, e.g. angry, stressed, hurried, tired, etc. Analysis of the user's (or third party) calendar gives indication about the physical location of the user over time, why and/or when the user might need the information (giving a talk on the topic), time available to study the queried information (time left until the talk), etc. Further, user reaction/emotion associated with viewing search results and/or search segments give an indication about whether or not the information is relevant to the user or user context at the time. For instance, the IoT sensor can determine if a user is nodding, frowning or falling asleep while reading.

Rather than information about the user's level of comprehension or situation, the User Preference Profile 265 generally includes information about the preferences of a user. For example, if the user (or third party) has a visual or an auditory learning preference, the TOC will emphasis topics in those particular learning channels. Here, the TOC might have a bias to place visual (or auditory) information first in a topic or subtopic list. Similarly, if the user has a preference for reading detail in an article rather than an overview summary in a slide presentation, the selection and sequencing in the SSTL 235 would emphasis those preferences in the TOC. In this instance, the SSTL might select a research article over a slide presentation summary on the topic or place the research article more prominently in the output sequence than the slide presentation.

As a non-limiting example, the User Preference Profile 265 includes information like formatting of a GUI display, type of information presented on a GUI display, output devices (e.g. audio, video), text messages to a phone, level of detail in the TOC (e.g. links and brief description only, thumbnail images, etc.)

Non-limiting examples of this embodiment of the process are now presented. A user provides the system 200 with a User Query 205. The Query Handler 210 may parse the User Query 205 into search terms and/or create an ontology of search terms. The Network or Internal Search Function 215 sends the search terms to the network for search. This function 215 may be part of a search engine.

In some embodiments, the Query Handler 210 develops an ontology of the User Query 205 and/or search terms. In alternative embodiments, this ontology may be developed in other steps of the process 200. There are many alternative ways for developing this ontology.

A search engine Receives Search Results 220 and Splits 225 the search results into Result Segments 225. The result segments 220 are then categorized by step 230.

Figure 3:
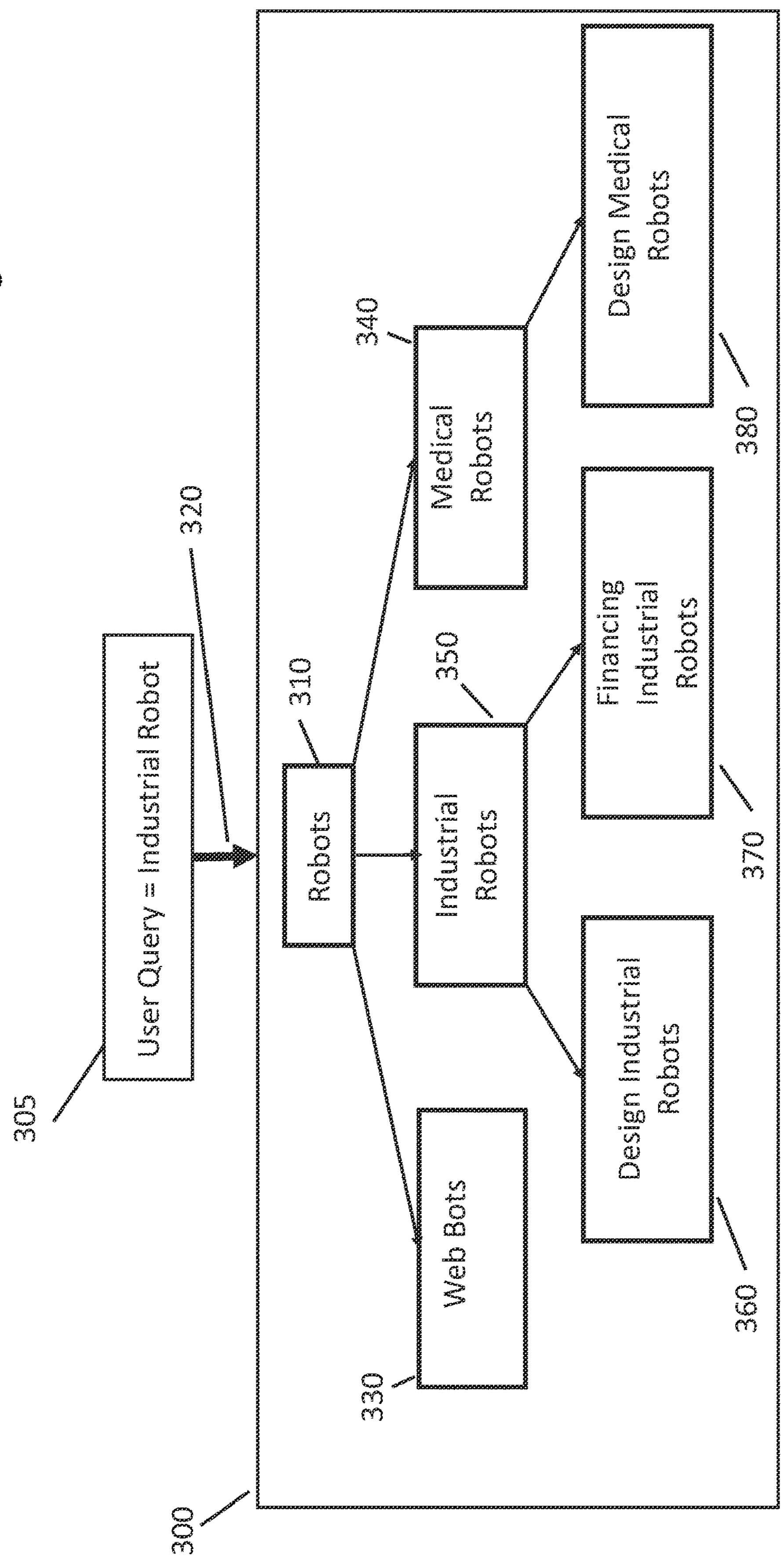
FIG. 3 is a diagram showing an example knowledge graph provided to a category/correlation step/engine.

FIG. 3 is a diagram showing an example knowledge graph 300 provided to the category/correlation step/engine 230.

Any or all of the Query Handler 210, search engine Receiving Search Results 220, and/or the Splitter 225 can create 330 the ontology or knowledge graph 300 by using NLP techniques.

In FIG. 3, the User Query (205, 305) and/or the search results 220 are organized into a hierarchical structure of concepts, where there are concepts (330, 340, 350), super-concepts 310 that include the concepts, and sub-concepts (360, 370, and 380) that are logically included in one or more of the concepts (320, 340, 350.)

In this non-limiting example, the User Query 205, "Industrial Robots" 350 is organized as a concept. Other concepts on this concept level of the hierarchy include other types of robots, like web bots 330 and medical robots 340. Other examples might include teaching robots, automotive robots, or diagnostic robots. All of these "robot concepts" fall under a more generic or super-concept of "robots" 310. Some of these concepts (330, 340, 350) may include sub-concepts (360, 370, 380.) For example, some of the results segments for industrial robots 350 can be categorized into the sub-categories of design industrial robots 360 and financing industrial robots 370. Some of the result segments for medical robots 340 will have sub-concepts about designing medical robots 380.

Other knowledge graphs/ontologies 300 are envisioned. For example, the levels of the knowledge graph might be broken down in to specialized AI agents configured according to a workflow, user context and search context (e.g., uses, time, location). The configuration of the AI agents further includes devices and/or operating platform relevant to how TOC render on devices, temporal context, geospatial context, (predicted) reaction types (e.g., gestures) of the user, cognitive properties or cognitive state of the user, mood (e.g., playful, tired or irritated) of the user, etc.

Some profile and/or context data related to the user and search terms may be provided directly by the user, e.g. preferences or comprehension level may be provided by way of user input. Data or information may also be inferred based on 265, if the user has not entered this information already. This may be done by machine learning and/or statistical analysis of historical data and other plurality of data sources. Examples of data sources which may be analyzed or obtained include, but are not limited to:

Historical saved TOCs in a given context, by the user and/or a cohort of users;

Historical cognitive properties of the user in response to TOCs (e.g., reactions, mood or emotional state);

Existing obtainable user profiles (e.g., education, skills, knowledge or experience level age, gender, job classification, historical reactions, engagement, or interpretations of previous TOCs, etc.) using 265;

Current and previous search activities of the user (e.g., browsing the internet, watching videos, purchasing behavior or listening to music);

Data from sensors of the user device, or other related devices, including historical responses or interactions to a generated TOC, feedback to a generated TOC provided by the user and/or a cohort of users;

Previously learned interactions, effectiveness, reactions, engagements, or interpretations of generated TOCs, analysis of historical feedbacks etc. of the user or a cohort of users.

The concepts/ontology 300 from the Concept Generator 245 are now applied 275 in the categorizing and correlating 230 the Result Segments 225. The table and description below are meant only to be non-limiting and illustrative and a description of one embodiment of this step 230.

TABLE 1

| Concept | Correlation | Action |
|---|---|---|
| Robot | 30% | Delete - low correlation |
| Web Bot | 5% | Delete - low correlation |
| Industrial Robot | 67% | Select |
| Finance of I. Robot | 70% | Select |
| Design of I. Robot | 95% | Select |
| Medical Robot | 30% | Select |
| Design of Med Robot | 67% | Select |

The first column (column 1) of Table 1 lists the concepts in the knowledge graph/ontology 300 in FIG. 3. The second column (column 2) of Table 1 shows the correlation 230 of the respective concepts 300 to one or more of the Result Segments 225. This correlation 230 can be performed in many ways. For example, a word count of each of one or more concepts in column 1 is done for each of the Result Segments 225. The correlations in column 2 are loosely based on the number of words each Result Segment 225 has with the concept ontology 300. The numbers are for example, illustrative purposes and not meant to be accurate, rigorous, or reflective of any particular correlation method available to one skilled in the art.

The third column of Table 1 (column 3) shows an action take based on the correlation in column 2. For example, the action might be to select or de-select (delete) 235 a Result Segment 225 based on a level or threshold of correlation. For instance, while the Result Segments 225 having only the concepts of "Web Bot" might have been returned because of the occurrence of the word "robot" in the document/reference, there is no other correlation the User Query 205, e.g. "Industrial" or "Design." This results in a lower correlation score, e.g. 5% and a de-select (delete) action in column 3. The delete action removes the Result Segment 225 from the list and removes any connection to the referenced document over the network 50. This action can be initiated if the correlation is below a threshold correlation, or by a rule triggered in a rule-based system, or by other methods (see below), used to make this determination. In similar manner, the Result Segment containing only the concept of "Robot" is deleted because the correlation (here 30%) is below a threshold, e.g. there is no correlation of this reference to the concepts "Industrial" or "Design."

In this example, after the application 275 of the concept's 245 relevance, the concepts relating only to "Robots" and "Web Bots" are de-selected from Table 2 which is used to illustrate the application 280 of the Knowledge Profile 250.

TABLE 2

| Concept | Knowledge |
|---|---|
| Industrial Robot | 80% |
| Finance of IR | 10% |
| Design of IR | 40% |
| Medical Robot | 20% |
| Design of MR | 20% |

The Concept, column 1 of Table 2, shows the concepts of the result segments that were selected 230. The Knowledge, column 2 of Table 2, shows assumed examples of the level of the user's comprehension from the Knowledge Profile 250.

Table 3 is a non-limiting example of a User Context 255 record. In this example, the user must give a presentation in 2 days about investing in companies that sell robots and has a paper submission about robot design due in 2 weeks. The user has a high level of stress.

TABLE 3

| User Context |
|---|
| 1. Investing Presentation due in 2 days |
| 2. Robot design paper submission due in 2 weeks |
| 3. IoT stress measurement = high |

Table 4 is a non-limiting example of a User Preference Profile that indicates a high preference for information in video format.

TABLE 4

| User Preference Profile |
|---|
| High preference for video information |

Table 5 is a non-limiting example of an Attribute Table that lists selected Result Segments 225 and their attributes. Attributes of a Result Segment 225 descriptions of the Result Segment 225 like level of technical difficulty, subject matter or ontology of subject matter, format (text document, video, audio, etc.) page length, video duration, summary primer, etc.)

TABLE 5

| Result Segment | Attribute 1 | Attribute 2 | . . . | Attribute n |
|---|---|---|---|---|
| Segment 1 | Concept - Investing in Robot Manufactures | 10 page text document | | |
| Segment 2 | Industrial Robots | Video | | |
| Segment 3 | Design of Medical Robots | 15 page document | | |
| Segment 4 | Robot Design | Video | | |
| . . . | | | | |
| . . . | | | | |
| . . . | | | | |
| Segment m | | | | |

In one preferred embodiment, the SSTL uses a rule-base system to create the TOC. For example, the rule-based system might include rules that combine user preferences like:

1. IF user has a need for concept and has low knowledge of concept, THEN provide Segments with pre-requisite information
2. IF user has need AND stress THEN deemphasis Segments where user has high knowledge
3. IF Segment is a video THEN give a higher priority in TOC Applying the rules in this example, the user needs information about investing in robot manufactures, robot design, and has a high stress level.

Segment 1, the 10 page text document, is selected because it is on topic for investing in robot manufacturers, however the user has a low level of comprehension in this concept. Therefore, rule 1 would send a request 245 to the Query Handler 210 to develop a search query about pre-requisition information, e.g. financing and investing in companies, to include in the TOC with Segment 1. Since this is pre-requisite information, it would precede Segment 1 in the TOC sequence.

Segment 2 would be selected because it has concepts related to the user needs and it is given priority by rule 3 because it is a video, but it will be deemphasized because the user has a high level of understanding in this area—rule 2. (Note various criteria can be used to de-emphasize Segments: being lower in the concept ontology, having less detail, being in smaller font, etc.)

Segments 3 and 4 are on topic for the user's paper which is due in two weeks. However, even though Segment 3 is more closely aligned/correlated to the concept of "medical robots," Segment 4 might be given a higher priority in the TOC because it is a video.

Once all the Segments are weighted and/or sequenced 235 as determined by the rules, the Segments can undergo a process that creates an ontology based on criteria. For example, the TOC might be created to address the scheduling of the user needs by listing the concepts first that are needed first in time. For example:

TOC 1

A. Pre-requisite information about financing and inventing—obtained in other searches B. Segment 1, 10 page text document, "investing in robot manufacturers"

C. Segment 4, Robot Design video

D. Segment 3, Design of Medical Robot, 15 page text document

E. Segment 2, Industrial Robots, video

The TOC 1 might also be organized by creating an ontology by topic, for example:

TOC 2

Investing in Robot Manufacturers

A. Pre-requisite information about financing and inventing—obtained in other searches B. Segment 1, 10 page text document, "investing in robot manufacturers"

II. Robot Design

A. Segment 4, Robot Design video

B. Segment 3, Design of Medical Robot, 15 page text document

III. Background Information

A. Segment 2, Industrial Robots, video

Each of the generated TOC can organize the data and information in a way that is clearer to the user, a group of users (or third party) with respect to the knowledge 250, context 255, and preferences 265 of the user, a group of users (or third party.)

In addition, the system and method 200 learned pre-requisite information was needed by the user and provided it in the TOC.

As the user's knowledge level increases, e.g. as the user learns more about finance, and the user's context changes, e.g. after the presentation on investing and high stress level is over, the process 200 can be run again to reflect the changes in user level of understanding 245 and context 255.

For instance, if the biometric parameters received by the User Context 255 that shows the user is relaxed, the TOC would not abbreviate or de-emphasize Segment 2 and might even provide more and more detailed information about the concepts e.g. given more free time on the user's calendar.

FIG. 4 is a diagram showing one alternative embodiment 400 of this invention using a Deep Stacked Neural Network (DSNN) 455.

This embodiment 400 comprises a Contextual Query Block 430, a History Generator Block 450, and an Implicit Learning Block 490.

In a preferred embodiment of the Contextual Query block 430, a Structured Query Language (SQL) query is submitted by the user where NLP and semantic content analysis engine will record user's input and store it for future referencing to correlate the need of user and establishing pattern history.

In a preferred embodiment of the History Generator block 450, a Cloud Database stores the commands/queries along with geo-spatial metrics information and context at the time the user submitted the query. It also comprises information about the user's knowledge and pattern history gathered or consumed by the system over a time period T to generate dynamic user profile.

An additional preferred embodiment of the Implicit Learning block 490 determines a predicted search based on buffering and storing previous search terms and using dynamic user profile to generate future search sequences.

The Contextual Query Block 430 includes a Query Analysis engine 410 and a User Context module 420. The History Generator Block 450 includes a User's Knowledge module 440 and a Historical Output 460 of a Personalized TOC. The Implicit Learning Block 490 comprises a user's Predicted Search Requirement 470 and a Feedback module 480. Blocks 430, 450, and 490 provide input into the DSNN 455.

In a preferred embodiment, the Query Analysis module 410 includes the user's current search query analysis via natural language processing, NLP and IBM's Watson Knowledge discovery.

The User Context module 420 contains information about the need of the user aligned with the current search query, gathered from IoT sensor feeds and using a variant of neural network (e.g., recurrent convolutional neural network) models for discrete correlation of user's need to queried terms.

The User Knowledge module 440 includes the user's knowledge level (e.g. knowledge based in the cloud database gathered via various sources.)

The Historical Output module 460 includes historical output of the Personalized Table of Contents (TOC) generator. Historical output is correlated with user's dynamic profile being generated and stored in cloud DB based on previous search terms and keeping into account user's preferred choice of generated output.

The Predicted Search Requirements module 470 includes predicted search requirements and topics of interest like pattern history and Long Short-Term Memory Network (LSTM) modelling for prediction of search required. Using the LSTM machine learning model with timestamp, the system identifies the relative position of the search query within the topic sequence and will also be predicting the user's search query via tracking of previous logs, agenda/tasks assigned to the user, etc. Hence, appropriate topic sequences can be identified and shown as part of the generated TOC.

In yet another embodiment, the TOC can change dynamically as the user's experience level grows. For example, let's assume that a user searches on "car maintenance" as he has just purchased his first car. The personalized TOC might include very general maintenance concepts (like check oil level daily, check tire pressure, respond to warnings on the instrument panel, change the oil when the warning light indicates). As the user becomes more familiar with the car, as determined by time, internet searches, etc. then subsequent searches on "car maintenance" can give more advanced, and detailed specific information for him given his car and maturity (like how to change the oil, how to change the tire, where the jack is located, etc.). Using a machine learning model in Machine Learning Models 455 the system may create a topic sequencing output, with different types of knowledge levels for different users. In one implementation the machine learning model is the multi-level Deep Stacked Neural Network (DSNN) model that takes the above features as input to output a dynamic TOC preferred by the user.

The TOC can have one or more sub topics, or optional topics and will be arranged to maintain the continuity of the topic. The continuity of the topic can be identified based on a self-learning method and can also be corrected based on closed loop feedback. If any topic is completed as determined by the user, then the system will automatically be marking the topic as completed in TOC.

In one embodiment, at any point of time, a method of saving the generated TOC against the user account, which further can be appended to TOC automatically based on predicted search requirement and knowledge gained by the user. The user can share the created TOC in social networking sites and the same can also be used for recommending other users while creating a dynamic TOC.

As stated above, the user's explicit feedback can be captured to allow for active learning and adjustments in the TOC generation process. Furthermore, depending on the user persona and preferences the TOC may be in visual format (i.e. the output medium can be adjusted), and TOC augmented with more effective means of communication to either capture or maintain user focus. User can be explicitly navigated to certain areas of TOC, which may benefit him/her in the long run.

In another preferred embodiment, the invention is used in a group setting where the knowledge and context profiles are collaborative settings of the group. In some embodiments, the TOC understands and/or predicts the context of the discussion (e.g., in a Slack channel), and further looks how to educate the group members based on the possible: a) gaps in their knowledge b) requirements of the project/goals of the work and c) ensuring that all the team members are "on the same page" with respect to understanding of the matter. Team roles may further drive the "level" of detail that is presented on each individual TOC.

Figure 5:
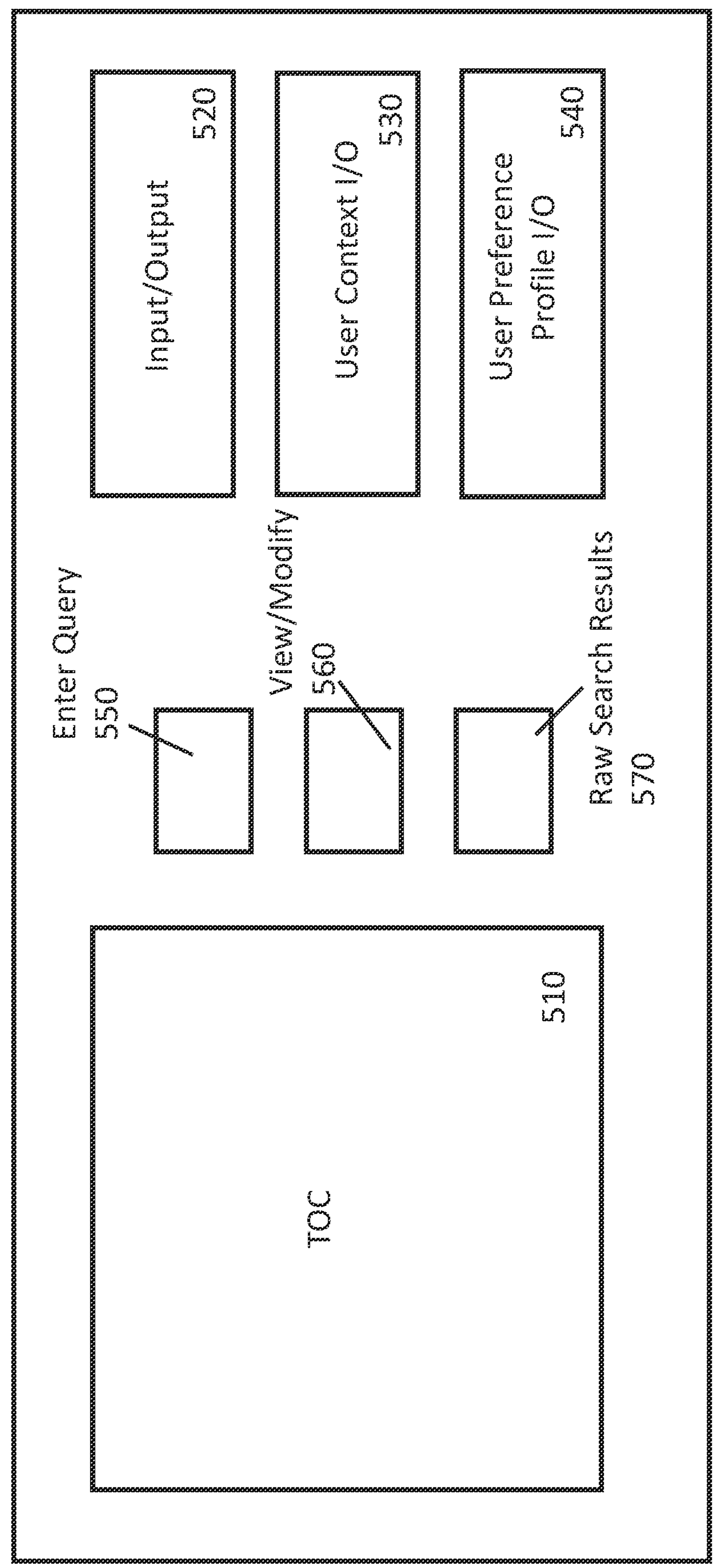
FIG. 5 is an illustration of an example graphical user interface (GUI) displaying a Table of Contents (TOC.)

FIG. 5 is an illustration of an example graphical user interface (GUI) 500 displaying a Table of Contents (TOC) 510.

The GUI has regions for displaying, inputting, and modifying information relating to the user Knowledge Profile 250 Input/Output (I/O) 520, User Context 255 I/O 530, and User Preference Profile 265 I/O 540. There is also an area to enter 550 a User Query 205 and view/modify 560 concepts and/or knowledge graphs 300 generated by the system (200, 400.) Information about requests 245 for additional and/or modified searches is also provided.

The user can enter a User Query 205 and view the concepts and/or knowledge graph 300 the system identifies in the User Query 205. By making changes to the Knowledge Profile 250, User Context 255, and/or User Preferences 265, the user can see effects of these changes in the TOC 510 and/or the raw search results 570. For example, the user can make real time changes to the Knowledge Profile 250 (or changes can be made by other ways) and the effects of the changes will show on the display of the TOC (240, 510.)

In a preferred embodiment, the raw search results may include one or more of the Result Segments 225. The Result Segments can be identified, e.g. by color, annotation, meta data, etc. to include information about attributes of the Result Segment 225. For example, a Result Segment 225 can be identified as having a concept that the user understands with a low level of comprehension.

Result Segments 225 displayed 570 can change as the user accesses the display 570. For example, a Result Segment 225 that is deemphasized because the user has a high level of comprehension of the concept in the Result Segment 225 can be expanded to show more detail. Results Segments 225 (and related concepts) can also be chosen to be emphasized, deemphasized, added, and/or deleted manually by the user 570.

The descriptions of the various embodiments of the present invention are presented for purposes of illustration and/or example but are not intended to be exhaustive or limited to the embodiments disclosed. Given this disclosure, many modifications and variations will be apparent to those of ordinary skill in the art without departing from the scope and spirit of the described embodiments. The Figures and their description are conceptual, not to scale, and not meant to be used as formal construction drawings. The terminology used herein is explanatory chosen to explain the principles of the embodiments and does not limit the concepts and reduction to practice of the invention to systems, components, and processes described by other terms. The invention in part or in entirety is envisioned to be used at the component, system, subsystem and any other product or process level. Alternative practical applications, implementations, or technical improvements of the invention are envisioned and are within the scope of the description.

We claim:

1. A computer system comprising:

one or more network interfaces, one or more central processing units (CPUs), one or more memories, and one or more inputs and outputs including at least one graphical user interface (GUI);

a search engine that sends one or more search queries and in response receives one or more search results over the network interface, the search queries having one or more search concepts;

a query handler that splits the search results into one or more result segments, determines a correlation strength between one or more of the result segments and at least one of one or more search concepts, and categorizes one or more of the result segments by selecting one or more of the result segments as selected result segments, the selected result segments having a correlation strength with one or more of the search concepts that exceeds a threshold of correlation and deleting one or more of the result segments that do not exceed the threshold of correlation;

a knowledge profile that has information about a comprehension level a user has about one or more of the search concepts; and a Selection/Sequencing/TOC/Learn (SSTL) function that creates a table of contents (TOC) for the search results by selecting and sequencing the selected result segments in a result sequence and outputs the TOC to the user over one of the outputs, at least one of the selected results segments being modified in the TOC based a user knowledge of one or more of the search concepts, the user knowledge defined by the comprehension level of the user, wherein when the user has a low comprehension level, as determined by the knowledge profile, about one or more first search concepts and more selected result segments with the correlation strength exceeding the threshold of correlation with the first search concept are identified to the user, and wherein one or more of the selected result segments is prerequisite information about one or more of the search concepts; and wherein what is prerequisite information to the one or more search concepts is determined by the system.

2. The system of claim 1, wherein the SSTL, function is configured to establish the intended sequences of search results using an analysis of previously learned information.

3. A computer system comprising:

one or more network interfaces, one or more central processing units (CPUs), one or more memories, and one or more inputs and outputs including at least one graphical user interface (GUI);

a search engine that uses one or more of the search queries to receive one or more search results over the network interface;

a query handler that i. splits the search results into one or more result segments, ii. determines a correlation strength between one or more of the result segments and at least one of the search concepts, iii. selects one or more of the result segments, as selected result segments, the selected result segments having a correlation strength with one or more of the search concepts that exceeds a threshold of correlation, iv. deletes one or more of the result segments that do not exceed the threshold of correlation, and v. determines a result sequence for two or more of the selected result segments;

a user knowledge profile that provides a user level of comprehension for one or more of the result segments, and identifies one or more selected result segments where the user level of comprehension is lower than a knowledge threshold; and a Selection/Sequencing/TOC/Learn (SSTL) function that creates a table of contents (TOC) for the search results by ordering the selected result segments in the result sequence, identifies one or more of the selected result segments where the user level of comprehension is lower than the knowledge threshold, and outputs the TOC to the user over one of the outputs, wherein the SSTL function is configured to establish the intended sequences of search results using at least one of:

an analysis of a history saved TOCs in a context of one or more of the users;

an analysis of one or more cognitive properties of the user in response to TOCs;

an analysis of previous, current, and predictive search activities of the user; and an analysis of data from sensors of one or more user devices, and wherein when the user has a low comprehension level about a first search concept as defined in a user knowledge profile, and more selected result segments with the correlation strength exceeding the threshold of correlation with the first search concept are identified to the user, and wherein one or more of the selected result segments is pre-requisite information where the pre-requisite information is determined from an ontology of one or more of the search queries.

4. A system, as in claim 3, where the query handler initiates a search request for the pre-requisite information about one or more of the first search concepts.

5. A system, as in claim 3, where the result sequence is determined by one or more of the following: a chronological order of learning, a knowledge graph, metadata, a prerequisite requirement, a degree of correlation with the search query, and a degree of the user comprehension.

6. A system, as in claim 3, where the user level of comprehension is determined by one or more of the following: user input, user search history, user activity on social media, and user's interests.

7. A system, as in claim 3, further comprising a user context analyzer that determines a user context, the user context determining one or more of the following ways the TOC is outputted: a selection of result segments, the result sequence, how result segments are identified, and how result segments are structured and presented.

8. A system, as in claim 7, where the user context analyzer determines user context using one or more of the following inputs: user image, user input, user's calendar entries, user's social media activity, sensors in user's environment, user's interests, user's recent search history, user manipulation of search results, user search queries, user degree of comprehension, and a user profile.

9. A system, as in claim 7, further comprises a query predictor that provides the query handler with one or more of the search queries being predicted queries, the predicted queries having one or more predicted search requirements, the predicted search requirements obtained from one or more of the following: user search pattern history, modelling predictions, tracking of one or more previous logs, and agenda and tasks assigned to the user.

10. A system, as in claim 3, further comprising a User Preference Profile.

11. A system, as in claim 10, where the User Preference Profile includes one or more of the following: a preferred output device, a preferred information format for receiving information, a user learning preference, and a preference for video information.

12. A system, as in claim 3, where the TOC changes dynamically as the user level of comprehension increases after one or more future searches.

13. A system, as in claim 12, where the user level of comprehension is measured by one or more internet searches.

* * * * *